(12) United States Patent
Bradford

(10) Patent No.: US 6,954,750 B2
(45) Date of Patent: Oct. 11, 2005

(54) METHOD AND SYSTEM FOR FACILITATING THE REFINEMENT OF DATA QUERIES

(75) Inventor: Roger Burrowes Bradford, Great Falls, VA (US)

(73) Assignee: Content Analyst Company, LLC, Vienna, VA (US)

( * ) Notice: Subject to any disclaimer, the term of this patent is extended or adjusted under 35 U.S.C. 154(b) by 0 days.

(21) Appl. No.: 10/689,068

(22) Filed: Oct. 21, 2003

(65) Prior Publication Data

US 2004/0083211 A1 Apr. 29, 2004

Related U.S. Application Data

(63) Continuation of application No. 09/684,330, filed on Oct. 10, 2000, now Pat. No. 6,678,679.

(51) Int. Cl.[7] ............................................. G06F 17/30
(52) U.S. Cl. .................. 707/5; 707/4; 707/6; 707/100; 704/6; 715/501.1
(58) Field of Search ............................... 707/3, 4, 5, 6, 707/100; 704/9; 706/927; 715/501.1, 738

(56) References Cited

U.S. PATENT DOCUMENTS

| | | | | |
|---|---|---|---|---|
| 4,839,853 A | * | 6/1989 | Deerwester et al. ........... | 707/5 |
| 5,265,065 A | | 11/1993 | Turtle ............................ | 707/4 |
| 5,519,608 A | * | 5/1996 | Kupiec .......................... | 704/9 |
| 5,694,592 A | | 12/1997 | Driscoll ........................ | 707/3 |
| 5,696,962 A | | 12/1997 | Kupiec .......................... | 707/4 |
| 5,893,095 A | * | 4/1999 | Jain et al. ...................... | 707/6 |
| 5,893,717 A | * | 4/1999 | Kirsch et al. ............... | 706/927 |
| 5,913,205 A | * | 6/1999 | Jain et al. ...................... | 707/2 |
| 5,963,940 A | | 10/1999 | Liddy et al. ................... | 707/5 |
| 6,519,586 B2 | * | 2/2003 | Anick et al. ................... | 707/3 |
| 6,868,525 B1 | * | 3/2005 | Szabo ........................ | 715/738 |

OTHER PUBLICATIONS

Preliminary Examination Report for Application No. PCT/US01/42028, dated Aug. 5, 2002 (mailing date).

International Search Report for Application No. PCT/US01/42028, dated Nov. 5, 2001 (mailing date).

Ding, C., "A Similarity–Based Probability Model for Latent Semantic Indexing," *Proceedings of the 22nd Annual SIGIR Conference*, Berkeley, CA, Aug., 1999.

Dumais, Susan, et al., "Automatic Cross–Language Retrieval Using Latent Semantic Indexing," *AAAI–97 Spring Symposium Series: Cross–Language Text and Speech Retrieval*, Stanford University, Mar. 24–26, 1997, pp. 18–24.

Dumais, S., et al., "Automatic Cross–Linguistic Information Retrieval Using Latent Semantic Indexing," *SIGIR '96— Workshop on Cross–Linguistic Information Retrieval*, pp. 16–23, Aug., 1996. Available at website: http://lsi.argreenhouse.com/~remde/lsi/LSIpapers.html.

(Continued)

*Primary Examiner*—Shahid Al Alam
(74) *Attorney, Agent, or Firm*—Sterne Kessler Goldstein & Fox PLLC

(57) ABSTRACT

Refining a current query. Receiving information regarding the relevancy of documents retrieved from a document collection in response to a current query. Ranking the retrieved documents in accordance with the relevancy information. Forming a candidate query based on the rankings and analysis of locations of the retrieved documents in a latent semantic index vector space formed from the retrieved document. Applying the candidate query to the document collection. Ranking the documents retrieved in response to the candidate query in accordance with the received relevancy information. Comparing the ranking of documents retrieved in response to the candidate query and the ranking of documents retrieved in response to the current query with the received relevancy information. Choosing the query that produces the best ranking.

2 Claims, 11 Drawing Sheets

OTHER PUBLICATIONS

Dumais, S. T. (1995), "Using LSI for Information Filtering: TREC-3 Experiments," In: D. Harman (Ed.), *The Third Text Retrieval Conference (TREC3), National Institute of Standards and Technology Special Publication*, 1995. Available at website: http://lsi/argreenhouse.com/~remde/lsi/LSIpapers.html.

Dumais, S. T., "Latent Semantic Indexing (LSI) and TREC-2," In: D. Harman (Ed.), *The Second Text Retrieval Conference (TREC2), National Institute of Standards and Technology Special Publication 500-215*, 1994, pp. 105-116. Available at website: http://lsi.argreenhouse.com/~remde/lsi/LSIpapers.html.

Dumais, S. T., "LSI Meets TREC: A Status Report," In: D. Harman (Ed.), *The First Text Retrieval Conference (TREC1), National Institute of Standards and Technology Special Publication 500-207*, 1993, pp. 137-152. Available at website: http://lsi.argreenhouse.com/~remde/lsi/LSIpapers.html.

Deerwester S., et al., "Indexing by Latent Semantic Analysis," *Journal of the Society for Information Science*, 41(6), pp. 391-407, Oct., 1990. Available at website: http://lsi.agreenhouse.com/~remde/lsi/papers/JASIS90pdf.

* cited by examiner

FIG. 2

|  | Doc #1 | Doc #2 | ... | Doc #n |
|---|---|---|---|---|
| able | 1 | 0 | ... | 1 |
| acid | 0 | 2 | ... | 0 |
| ... | ... | ... | ... | ... |
| <term m> | 1 | 0 | ... | 1 |

FIG. 11

Are Koala bears objects of interest? Yes ◯ No ◯ Don't Know ◯

Is ant bear a relevant object? Yes ◯ No ◯ Don't Know ◯ is cub scout an irrelevant term? Yes ◯ No ◯ Don't Know ◯

Is Ursinus a synonym for bear? Yes ◯ No ◯ Don't Know ◯

[Submit]

METHOD AND SYSTEM FOR FACILITATING THE REFINEMENT OF DATA QUERIES

CROSS-REFERENCE TO RELATED APPLICATIONS

This application is a continuation of application Ser. No. 09/684,330, filed Oct. 10, 2000, now U.S. Pat. No. 6,678,679. Each and every document, including patents and publications, cited herein is incorporated herein by reference in its entirety as though recited in full.

FIELD OF THE INVENTION

The present invention relates generally to data processing apparatus and corresponding methods for the retrieval of data stored in a database or as computer files. More particularly, the present invention relates to methods and systems to facilitate refinement of queries intended to specify data to be retrieved from a target data collection.

BACKGROUND INFORMATION

A significant trend today is the rapid growth in the amount of information available in electronic form. For example, unprecedented amounts of textual and symbolic information are becoming available on intranets and on the Internet as a whole. Unfortunately, tools for locating information of interest in these large collections are quite limited.

Typically, when searching for information on an intranet or the Internet, a user creates a query that is intended to specify a particular information need. An information retrieval system then interprets this query and searches a target data collection to identify items in the collection that are relevant to the query. The retrieval system then retrieves these items, or abstracts thereof, and presents them to the user. In the process of presentation, it is desirable for the retrieved items, or abstracts thereof, to be ranked in the order of their applicability to the expressed information need of the user. Unfortunately, both formation of well-focused queries and informative ranking of retrieved items are quite difficult to do well.

One factor contributing to the difficulty of retrieving information of interest from target collections, such as large full-text databases, is the imprecise nature of human languages. The richness of human language is a strength in expressing ideas with full conceptual generality. In addition, all human languages incorporate significant elements of ambiguity. Both richness and ambiguity create problems from a retrieval perspective.

Approaches to text retrieval are confronted with the fact that multiple words may have similar meanings (synonymy) and a given word may have multiple meanings (polysemy). The typical English word, for example, has at least a half dozen close synonyms. In addition, there generally are a much larger number of broader and narrower terms that are related to any given word of interest. It is often infeasible for a user to anticipate all ways in which an author may have expressed a given concept. A user may, for example, consider using the word car in a query. An author of a document, however, may have used a different term such as automobile or horseless carriage. The author also may have used a more general term, such as vehicle, or narrower terms, such as Ford or Mustang. Failure to include all of these variants in a query will lead to incomplete retrievals.

Polysemy creates a complementary problem. Most words in most languages have multiple meanings. In English, for example, the word fire has several common meanings. It can be used as a noun to describe a combustion activity. It also can be used as a verb meaning to terminate employment or to launch an object. A particularly polysemous word, such as strike, has dozens of common meanings. For the 2000 most polysemous words in English, the typical verb has more than eight common senses, and the typical noun has more than five. Using such a word in a query can result in much extraneous material being retrieved. For example, a person using the word strike in a query, with the intent of retrieving material on labor actions also will be presented material on baseball, air strikes, striking of oil, people who strike up a conversation, etc.

In information retrieval, two metrics generally are applied in evaluating incompleteness and imprecision of retrievals. Recall is a measure of the completeness of retrieval operations. For any given query and any given collection of documents, recall is defined as the fraction of the relevant documents from the collection that are retrieved by the query. Precision is defined as the fraction of retrieved documents that are, in fact, relevant to the users information need. Both metrics typically are expressed as percentages. Historically, text retrieval systems typically have operated at recall and precision levels in the neighborhood of 20 to 30 percent. As the size of full-text databases has grown, however, these numbers have declined.

Information retrieval from the Internet offers a good example of the problems presented by: the tension between precision and recall; and large target collection volume. The types of queries typically formulated by users of Internet search engines frequently result in identification of tens of thousands of web pages as potentially relevant (see FIG. 1). Upon examination, the vast majority of these pages typically turns out to be irrelevant, i.e., contribute to low precision. That, itself, would be a lesser problem if the results were accurately ranked, i.e., if the most relevant web page was returned as the first result, the next most relevant as the second result, etc. Unfortunately, the quality of ranking as provided by current tools is typically less than optimal. If the search criteria are narrowed to increase precision, some relevant documents might be excluded leading to lower recall.

Most text retrieval systems accept queries in one of two forms, as Boolean logical constructions or as natural language inputs. Boolean constructions involve words connected by Boolean logical operators (e.g., AND, OR, NOT). For example, in response to the query: bear AND NOT (teddy OR beanie), a retrieval system using Boolean queries would retrieve documents that discuss bears, but not those that discuss teddy bears or beanie baby bears. Natural language inputs can take the form of sentences that are produced by the user. Alternatively, documents or portions of documents may be used as queries.

In theory, for any given information need and target information collection, a Boolean query could potentially be constructed that could be used to retrieve relevant information from the target collection with 100% recall and 100% precision. For realistic queries and collections, however, the corresponding Boolean construct might be very large. Some people find it difficult or uneconomical to create complex Boolean queries. This is strongly demonstrated by the observation that, on average, queries used with Internet search engines consists of slightly over two terms. Similar averages are also seen for queries employed on large intranets in government and industry.

While some users are capable of forming non-trivial queries containing more than two terms, some users have learned that modest increases in initial query complexity bring relatively limited increases in the quality of results. Better results are typically obtained when the user reviews selected documents that are retrieved and then makes iterative modifications to the query. Even in this case, however, there are restrictions. First, the initial query often constrains the scope of subsequent iterations. Not knowing what relevant information was excluded by the initial query, the user has few, if any, clues available that indicate how to modify the query to include missed relevant information in subsequent retrievals. Second, it is often difficult to think through what query modifications would be desired in order to improve a given result. The amount of time and effort required to produce effective Boolean queries with current tools is greater than many users invest.

One technique shown to be of considerable value when directly applied to text retrieval is Latent Semantic Indexing (LSI). See S. T. Dumais, *LSI meets TREC: A status report*, THE FIRST TEXT REtrieval CONFERENCE (TREC1), NATIONAL INSTITUTE OF STANDARDS AND TECHNOLOGY SPECIAL PUBLICATION 500-207, pp. 137–152 (1993) [DUMAIS I]; S. T Dumais, *Latent Semantic Indexing (LSI) and TREC-2*, THE SECOND TEXT REtrieval CONFERENCE (TREC2), NATIONAL INSTITUTE OF STANDARDS AND TECHNOLOGY SPECIAL PUBLICATION 500-215, 105–116 (1994) [DUMAIS II]; S. T. Dumais, *Using LSI for information filtering: TREC-3 experiments*, THE THIRD TEXT REtrieval CONFERENCE (TREC3) NATIONAL INSTITUTE OF STANDARDS AND TECHNOLOGY SPECIAL PUBLICATION (1995) [DUMAIS III]. Text retrieval solutions using LSI make use of a vector space representation of document contents to extract presumed underlying semantic meaning from a target collection. LSI has the following desirable features:

Language independence;

The ability to identify relevant documents, which do not include words specified in the query; and Independence of subject matter.

LSI techniques are described in Scott C. Deerwester, et al, *Indexing by Latent Semantic Analysis*, JOURNAL OF THE SOCIETY FOR INFORMATION SCIENCE, 41(6), pp. 391–407 (October, 1990) and U.S. Pat. No. 4,839,853, entitled COMPUTER INFORMATION RETRIEVAL USING LATENT SEMANTIC STRUCTURE to Deerwester et al. issued Jun. 13, 1989. The optimality of this technique is shown in C. Ding, *A Similarity-based Probability Model for Latent Semantic Indexing*, PROCEEDINGS OF THE $22^{ND}$ ANNUAL SIGIR CONFERENCE, Berkeley, Calif. (August 1999) [DING].

LSI techniques operate on a collection of text passages, typically referred to in the literature of the art as "documents." The term "document", however, in this case can includes paragraphs, pages, or other subdivisions of text and not necessarily or only documents in the usual sense (i.e., externally defined logical subdivisions of text). Along these lines, this discussion refers to the text passages of interest as "documents."

The use of LSI is illustrated with reference to FIG. 2. As a preliminary step in using the LSI technique, a large sparse matrix (the T×D matrix) is formed. Each row in the T×D matrix corresponds to a term that appears in the documents of interest, and each column corresponds to a document. Each element (m,n) in the matrix corresponds to the number of times that the word m occurs in document n. Referring to FIG. 3, the known technique of singular value decomposition (SVD) can be used to reduce the T×D matrix to a product of three matrices, including a matrix that has non-zero values only on the diagonal. Small values on this diagonal, and their corresponding rows and columns in the other two matrices are then deleted. This truncation process is used to generate a vector space of reduced dimensionality as illustrated in FIG. 4 by recombining the three truncated matrices in to (T×D)' matrix. Both terms and documents are located at specific positions in this new vector space.

The primary application of latent semantic indexing has been in the area of information retrieval. In that application, queries are treated as pseudo-documents. Documents are ranked in terms of similarity to the query based on-a cosine measure between the vector corresponding to the query and the vector corresponding to that document in the LSI vector space. Experiments have shown that closeness of documents in this sense is a good proxy for closeness in terms of information content. See [DUMAIS I], [DUMAIS II], [DUMAIS III]. In known applications, the LSI approach is used to conduct the overall search operations and to provide a ranking of the results.

SUMMARY OF THE INVENTION

The present invention provides significant benefits over existing systems and methods for retrieval of data.

According to some embodiments, a document retrieval system receives information regarding the relevancy of documents retrieved in response to a current query. The retrieved documents are ranked in accordance with the relevancy information. A candidate query is formed from the rankings and an analysis of locations of the retrieved documents in a latent semantic index space formed from the retrieved documents. The candidate query is applied the document collection and documents retrieved in response to the candidate query are ranked in accordance with the received relevancy information. The ranking of documents retrieved in response to each query is the compared, the query that produces the best ranking is chosen as the new query.

According to other embodiments for refining a strategy for ranking the results of a document retrieval operation, the results of a document retrieval process are indexed into a latent semantic index vector space. Information is received regarding relevancy of the results to an information need. The results are ranked based on the current ranking strategy. The current ranking strategy is modified based on the location of the ranked documents in the latent semantic index vector space and the relevancy information. The results are ranked based on the new ranking strategy. The ranking strategy that produces results that better correspond to the relevancy information is chosen as the refined ranking strategy.

According to further embodiments, the invention includes methods for refining a current query. In these methods, a subset of documents retrieved in response to a current query is ranked with respect to relevancy of the retrieved documents to an information need. A subset of the documents retrieved in response to a candidate query is ranked with respect to the same standard. The ranking is a function of the context of the relevancy information and the location of each document in a latent semantic index vector space. The refined query is chosen as the query which produces a ranking indicating that the retrieved documents corresponding to the query more closely matches the relevancy information.

In yet other embodiments, the invention includes methods for forming a hypothesis for refining a query. In these embodiments, a document collection is indexed into a latent semantic vector space. Information regarding the relevancy with respect to information needs is received regarding the retrieved documents. At least one hypothesis is formed regarding modifications to a query based on analysis of the context of the relevancy information and the documents corresponding to the relevancy information in the vector space.

BRIEF DESCRIPTION OF THE SEVERAL VIEWS OF THE DRAWINGS

Preferred embodiments of the present invention are shown by way of example and not limitation in the accompanying drawings.

Figure 2:
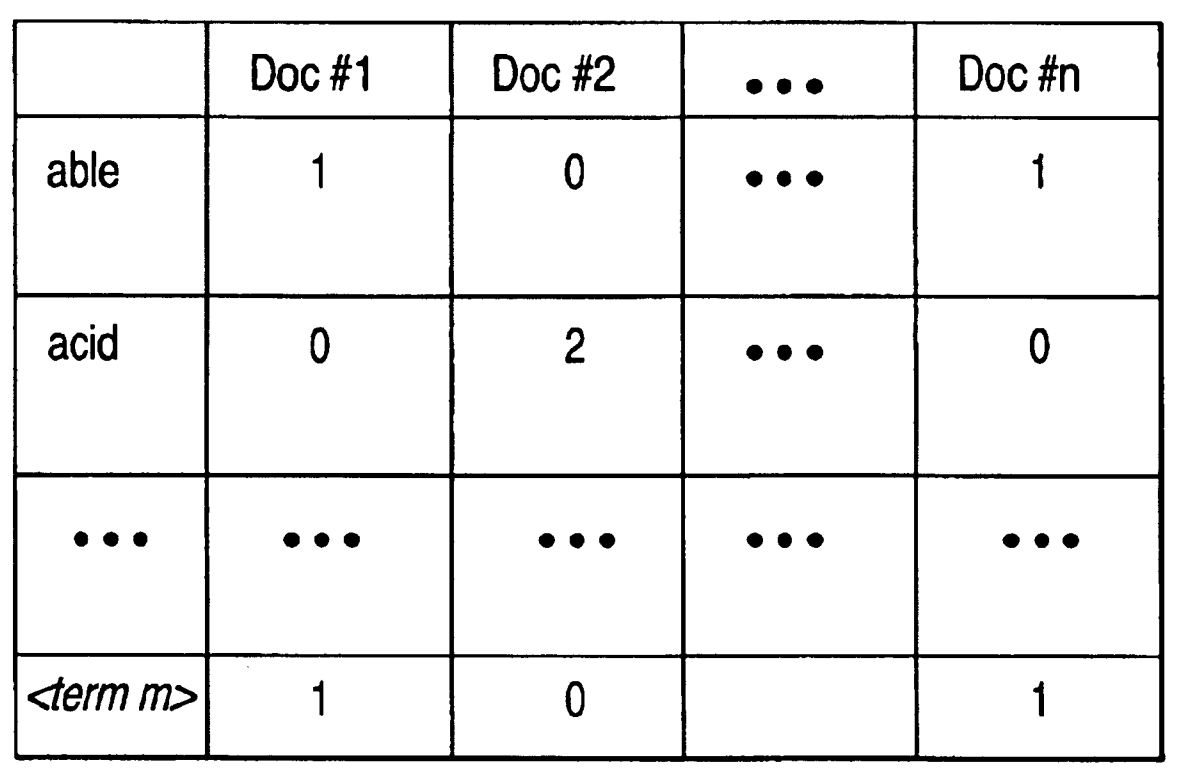

FIG. 2 is a schematic illustration of a large sparse Term× Document matrix constructed as an initial step in Latent Semantic Indexing (LSI)

FIG. 11 is an illustration of an example of a user interface input form of a preferred embodiment of the present invention

DETAILED DESCRIPTION OF THE INVENTION

Preferred embodiments of the present invention provide a method for refinement of queries used in retrieving information from large full-text databases. This method can be used, for example, in at least two important ways:

In a near-real-time manner as an intermediary between a user and a text retrieval system, and;

As a means for creating software agents that carry out information retrieval operations for a user.

Figure 1:
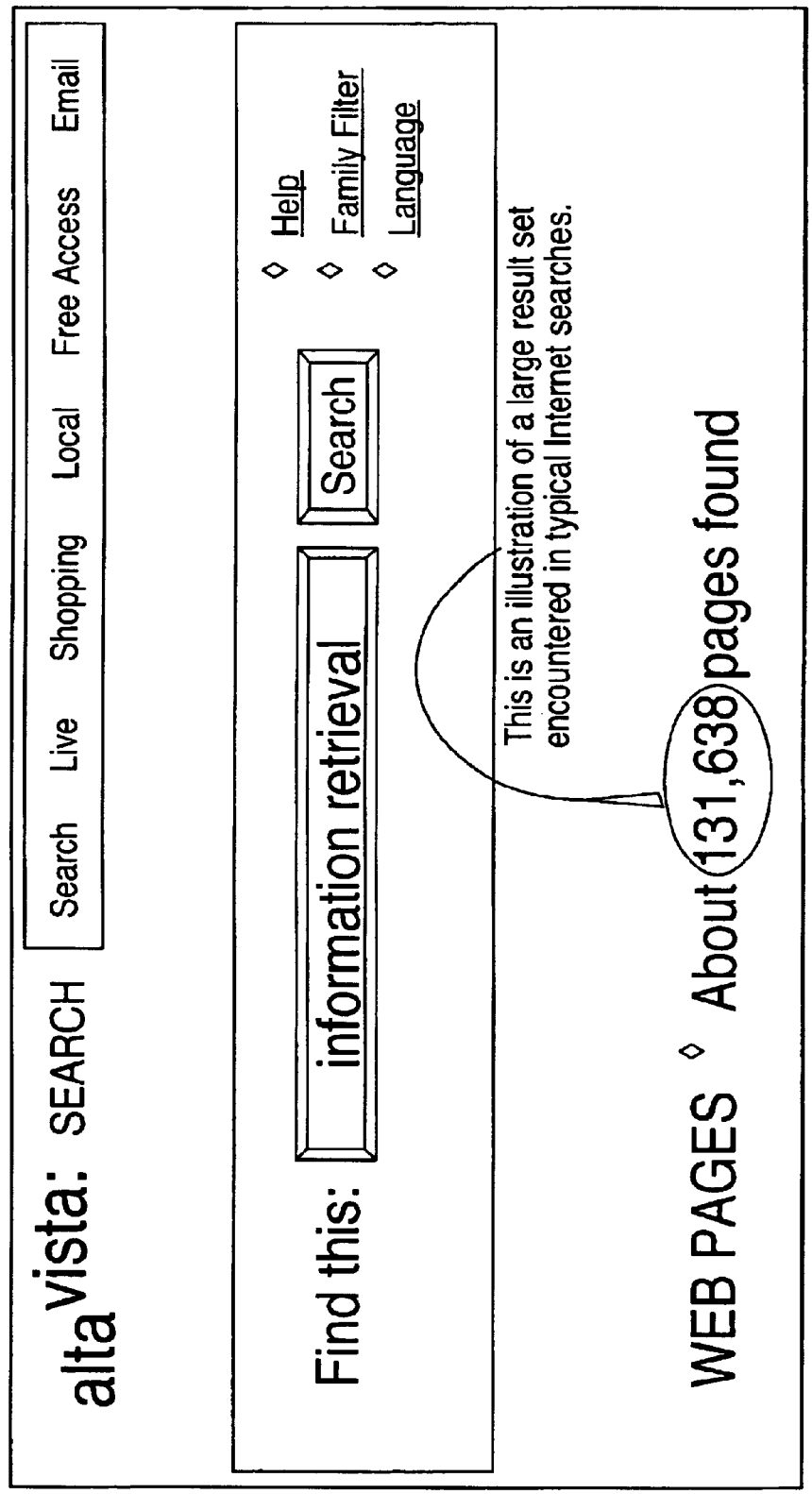
FIG. 1 is an example of large result size associated with known Boolean-query Internet searches.
Figure 3:
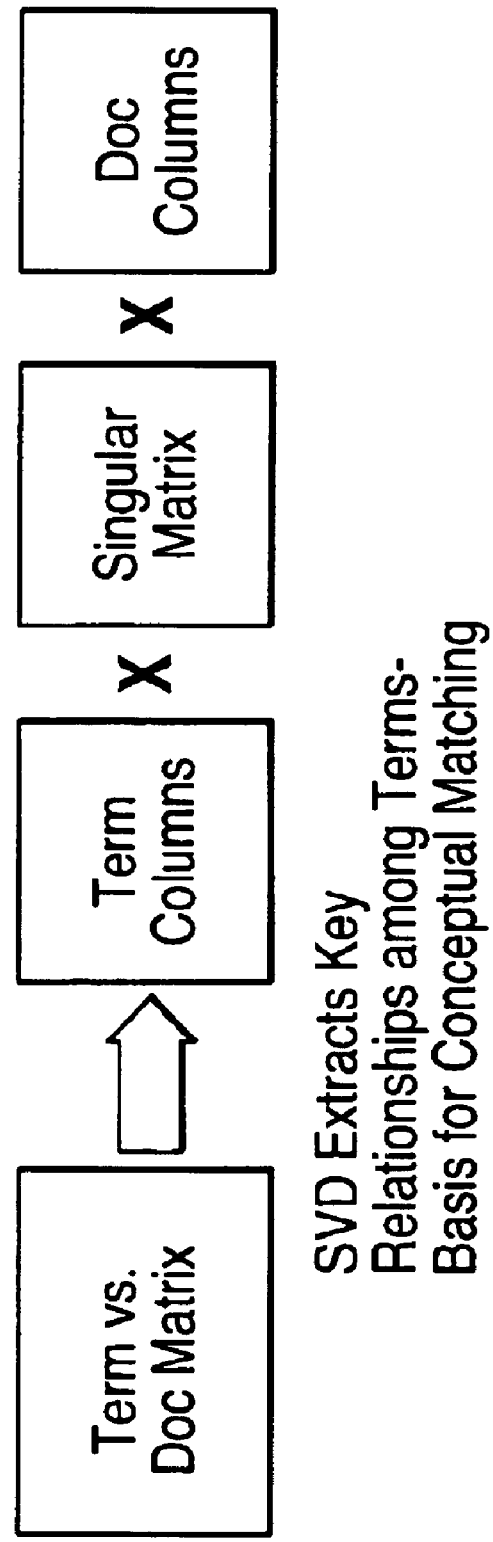
FIG. 3 is a schematic illustration of decomposition of a Term×Document matrix into three component matrices, including a singular value matrix, in accordance with LSI.
Figure 4:
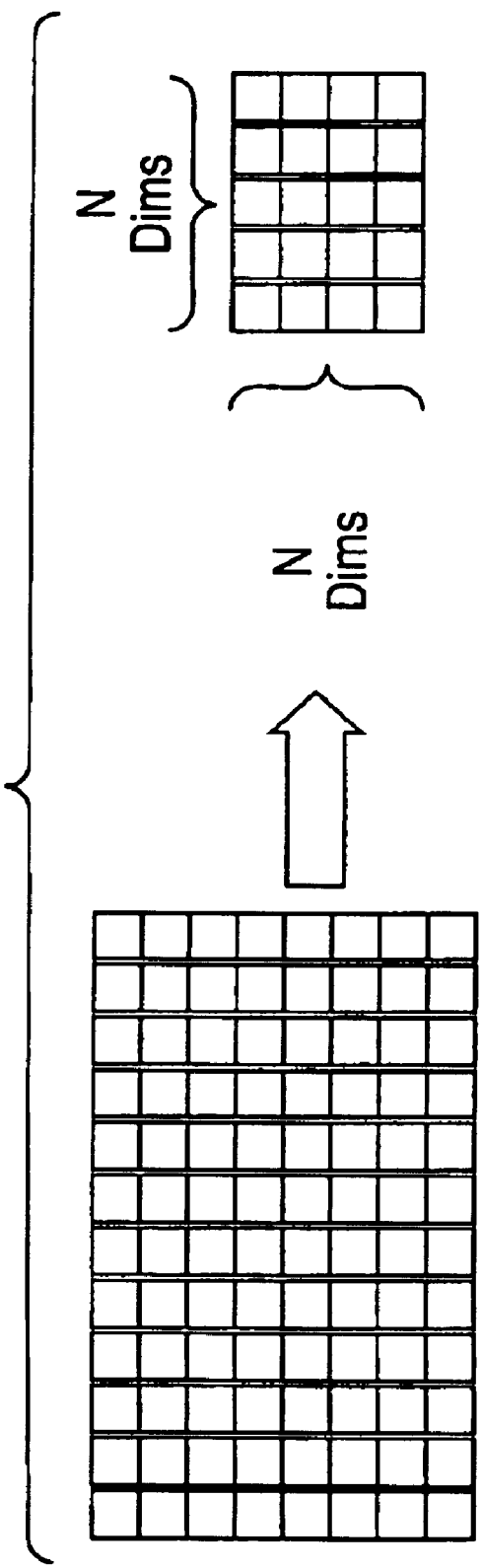
FIG. 4 is a schematic representation of the overall effect of singular value decomposition (SVD) as applied to a large sparsely populated matrix to result in a vector space of reduced dimensionality, in accordance with the technique of Latent Semantic Indexing (LSI).
Figure 5:
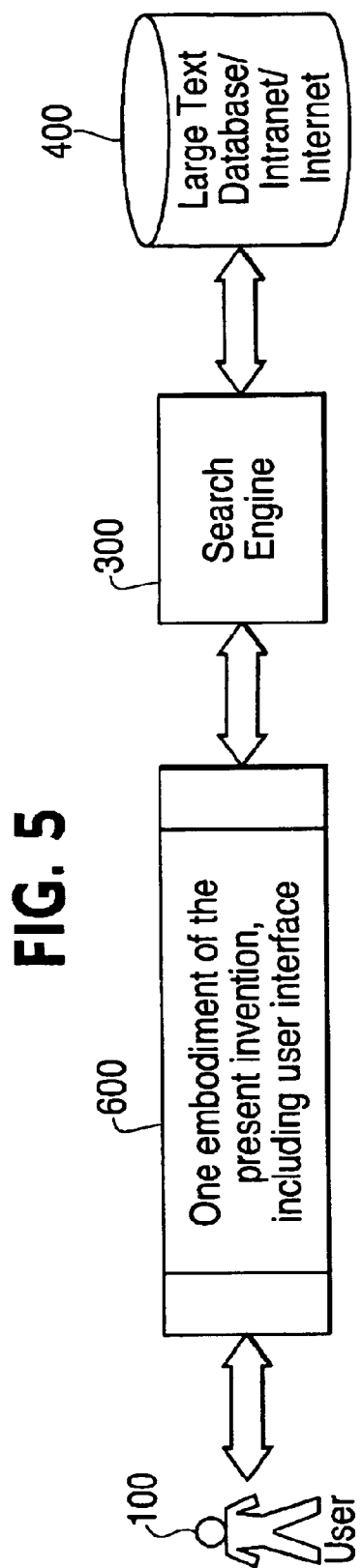
FIG. 5 is a block diagram illustrating the intermediary role played by preferred embodiments of the present invention.

In these cases, preferred embodiments of the invention provide an intermediary 600 between the user 100 and a full-text search engine 300 (see FIG. 5).

In preferred embodiments, the invention provides a method for accepting simple inputs from a user 100 and converting them to a complex query structure. Although various other retrieval mechanisms could be employed, the embodiments discussed below involve the transformation of user inputs into complex Boolean queries. Boolean query systems preferably have the following characteristics:

Boolean operators constitute a complete set of logical operations.

With nested logic, information requirements of arbitrary complexity can be expressed.

Boolean queries can be created that retrieve desired information with high precision.

One drawback to the use of Boolean operators in information retrieval systems is that it can be difficult for humans to deal with the cognitive load of manually creating and managing complex Boolean queries that will result in high recall and precision when applied to a target data collection. The present invention can provide means of facilitating the creation of such queries. A block diagram of an architecture designed to implement preferred embodiments of the present invention is presented in FIG. 6.

In the operation of one preferred method of the present invention, the following steps can take place:

The user 100 inputs a small amount of information that begins to describe his or her information need. This is entered into a user interface 690.

A hypothesis generator 680 organizes this input and provides it to a query generator 610 module.

The query generator 610 formulates an initial Boolean query compatible with the search engine 300 based on the inputs provided to it.

This initial Boolean query is sent to a search engine 300 that applies the query in retrieving documents from a target data collection 400.

The retrieved documents are loaded into an extracted document data store 620.

The extracted documents are indexed using both a Boolean retrieval system 640 and a system based on a vector space representation of the query and the contents of the extracted documents. In a preferred embodiment of the present invention, an LSI engine 630 is used to create an LSI vector space.

A ranking engine 650 ranks the result set and provides this information to the hypothesis generator 680.

Although other vector space representations can be used to index the query and the extracted documents, the technique of Latent Semantic Indexing (LSI) provides a vector space that is optimal in significant respects. It has been demonstrated that the LSI space is an optimal semantic subspace based on maximum likelihood estimation. [DING]. The LSI technique can provide a method for extracting the semantic information that is latent in a collection of text.

In order to visualize the operation of preferred embodiments of the present invention employing an LSI vector space, it is useful to keep in mind the following dual aspect of the LSI vector space:

Every indexed document is located at the geometric mean of the terms that it contains.

Every indexed term is located at the geometric mean of the documents that contain it.

Preferred embodiments of the present invention exploit this dual aspect of the LSI space.

In known applications, the LSI approach is used to conduct the overall search operations and to provide a ranking of the results. In preferred embodiments of the present invention, the LSI technique is used to guide retrieval operations that are carried out by, for example, a Boolean text retrieval system. In preferred embodiments of the present invention, the LSI technique is used:

As a source of information for forming hypotheses regarding potential query enhancements, and As a mechanism for testing hypotheses regarding query enhancement.

Figure 6:
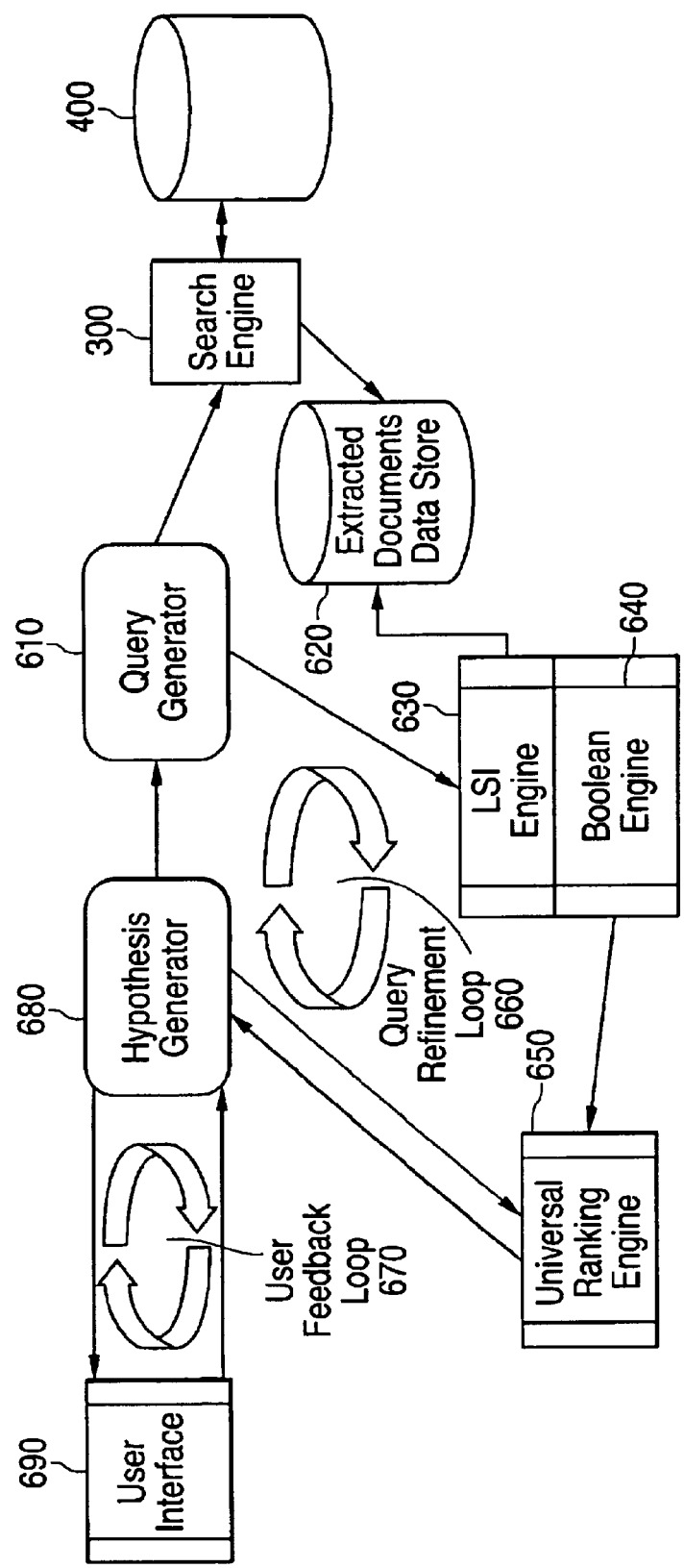
FIG. 6 is a high-level architecture representation of one preferred embodiment of the present invention.

This use of the LSI technique for hypothesis generation and testing represents a novel application of the technique. With the LSI technique, documents that are close together in the LSI space have very similar distributions of words. Generally this also indicates that they are quite similar in meaning. In preferred embodiments of the present invention, this is exploited by use of a query refinement loop 660 in which queries are iteratively refined. Preferably, a second loop, the user feedback loop 670, also is implemented, in which feedback from the user is employed in guiding the query refinement process. These two loops are shown in FIG. 6. While it is desirable to implement both loops in some preferred embodiments of the present invention, other preferred embodiments of the present invention advantageously employ only one of the two loops.

In preferred embodiments, the present invention further includes the following steps.

Within the hypothesis generator 680, information from the LSI space is used in formulating hypotheses regarding how the current, working Boolean query might be modified.

The query generator 610 is employed to formulate the candidate improved query based on output of the hypothesis generator 680.

The candidate query, supplied to the search engine 640, is applied by the search engine 640 to the extracted documents data store 620

The results of the candidate query are ranked and this ranked result set is compared to the current ranked result set.

If the new result set more closely matches the user's information need, the candidate query is adopted as the new working query.

This set of steps can be iterated until, preferably, one of several events interrupts or terminates the loop:

The user 100 interrupts the process to examine current results.

Those hypotheses with a reasonable likelihood of improving the query have been tested.

A point has been reached at which successive hypotheses are not generating significant improvement in the results.

Preferably, the ranking strategy to be applied to the results also is iterated in the query refinement loop 660.

In some preferred embodiments of the present invention, a user feedback loop 670 plays a role in guiding the query refinement process. The user 100, for example, provides feedback in two important ways:

While reviewing some of the documents that have been retrieved, the user 100 provides indications of the extent to which given documents correspond to his or her information need. There are, of course, many ways in which this degree of relevance might be indicated. In a simple case, the user rates selected documents as being either relevant or irrelevant. Other illustrative options include, as some examples: high, medium, or low relevance; relevant, neutral, and irrelevant; a numeric scale of relevancy, etc.

In preferred embodiments of the invention, queries are presented to a user 100 based on the activity in the query refinement loop 660. Such queries to the user 100 are designed to elicit information from the user that can be maximally beneficial in the query refinement process.

Preferably, the two loops 660, 670 run asynchronously. Typically, the query refinement loop 660 will execute far more often than the user interface loop 670. In embodiment where the present invention is used in a software agent role, the query refinement loop may be carried out many thousands of times relative to each instance of user interaction In some embodiments of the present invention, there is a third loop in which the search engine 300 that indexes the overall target collection 400 is used to retrieve additional documents that are added to the data store of extracted documents 620. This is preferably done in at least two instances, both of which involve increasing the recall of the search:

The query refinement process has created a query that, when applied to the target text collection 400 by the search engine 300, is likely to extract a significant number of additional documents that have not previously been loaded to the data store of extracted documents 620.

A significant number of new documents have been added to the target collection 400.

This third loop can play a useful role. The following discussion focuses on two loops preferably used in embodiments of the present invention.

In many applications the target text collection 400 of interest will be the Internet. The search engine 300 used to carry out the searches in this third loop may be any of a number of extant search engines. Other applications will involve retrieval operations conducted against internal databases such as an intranet within an organization. In this case also, there are a large number of text retrieval systems that could be employed to carry out this search engine function. In either case, preferred search engines have the following characteristics:

The search engine 300 employed should be capable of correctly processing complex Boolean queries generated by the present invention. In general, these queries may be much larger than those generated manually by humans. The queries will typically contain many more terms and make much greater use of nested logic.

Preferably, the connection between the search engine and the system of the present invention is characterized by high bandwidth. This is desirable in order to facilitate the downloading of significant numbers of documents. The downloads associated with embodiments of the present invention can constitute a greater load on the search engine than that typically presented by human users. Particularly as an intermediate product of the search based on the initial query, many more documents may be downloaded than a human would be likely to examine directly. In general, the user will start the process with a simple input. The software will interpret this in a broad sense, in order to download a wide selection of documents. The query refinement process subsequently will greatly narrow the set of documents selected from this downloaded collection for presentation to the user.

The iteration processes of preferred embodiments of the present invention are preferably designed to provide the following results:

A query with improved precision and recall as compared to human-directed known search engines; and An improved ranking of the retrieved documents in terms of their relevance to the user's stated information need when compared to existing ranking schemes.

Of the two results, producing an improved ranking is more difficult to achieve. Obtaining high values of recall using the search engine 300 is relatively straightforward once the query is refined by preferred embodiments of the present invention. The present invention greatly reduces the requirements for precision of the search engine's 300 retrieval operation. The product of the search engine 300 is used as an input to the internal processes, rather than being presented directly to the user 100 via the user interface 690.

Figure 7:
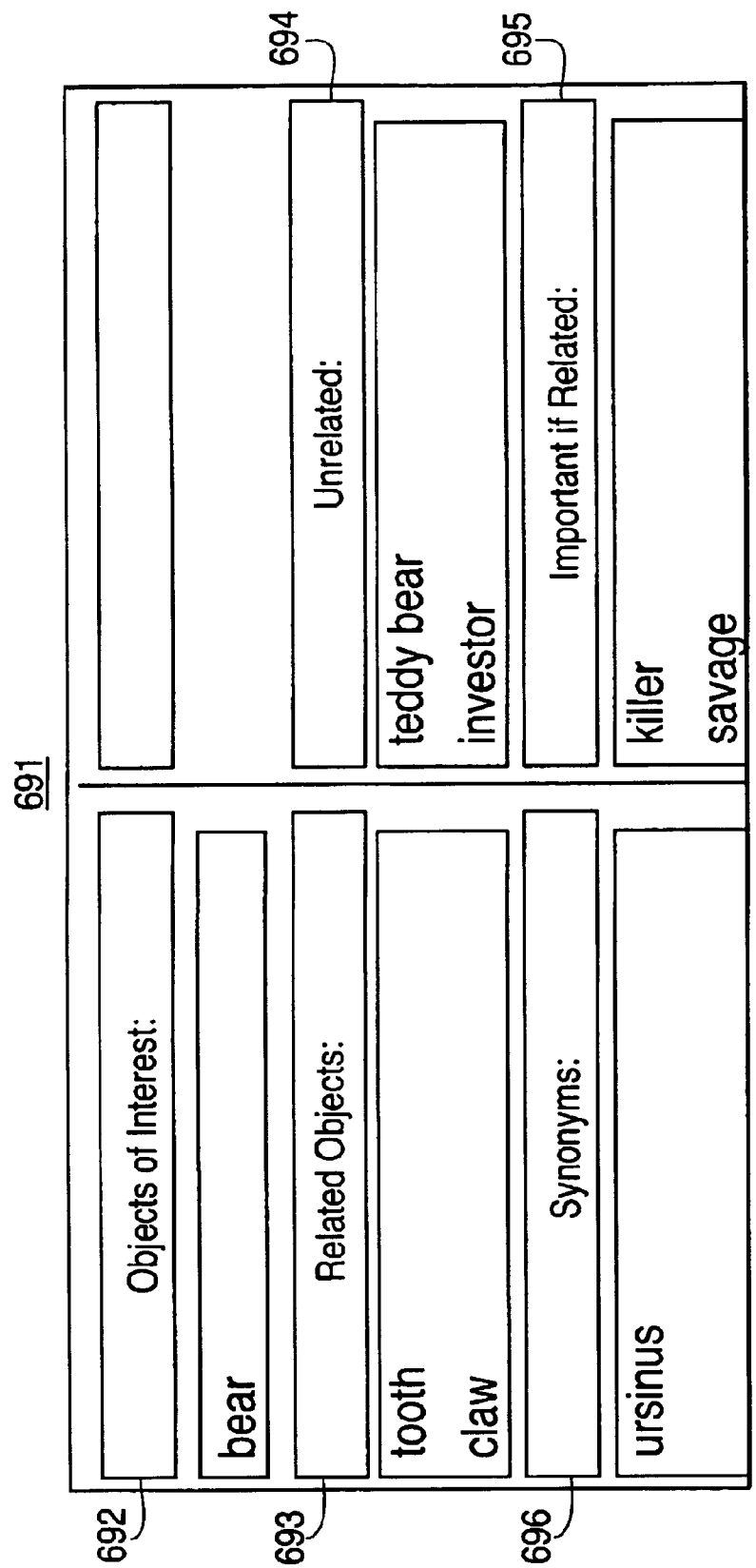
FIG. 7 is an illustration of an example of a user interface input form of a preferred embodiment of the present invention.

A wide variety of user interfaces 690 could be employed in providing inputs to a retrieval system embodying the present invention. This includes a number of user interfaces that have been developed for existing information retrieval systems. Preferred embodiments of the present invention implement simple user interfaces 690 to mitigate the cognitive load on the user 100. Therefore, in some preferred embodiments discussed below, a minimal user interface 690 is employed. In preferred embodiments, the user interface 690 can include an input form 691 as illustrated in FIG. 7, wherein the user 100 may type words or phrases that fall into one or more of the following categories:

Items/objects of interest 692;
Probable related items/objects 693;
Unwanted/unrelated items 694;
Synonyms for any of the above 696; and
Items, which are important if related 695.

This illustrative simple input form 691 does not require the user 100 to have an understanding of Boolean operators or of how to formulate logic statements. One feature of preferred embodiments of the present invention is that those embodiments can deal effectively with such simple inputs. An initial query entered through such an interface 690 and input form 691 could consist of a single word. This minimization of the cognitive load on the user is an advantageous factor. One feature included in the preferred embodiment of the user input form 691 described above, and illustrated in FIG. 7, is the provision for inclusion of items that would be of particular importance if they were found in relation to the indicated objects of interest. This feature can be of particular value in optimizing rankings of retrieved documents for users.

The following non-limiting example illustrates the operation of a preferred embodiment of the present invention. Let us assume that the user 100 wishes to find information about bears. For simplicity, we will assume that the user 100 inputs the single word bear as a term of interest 692 into a form 691 via the user interface 690. The Query Generator 610 accepts this as the one-term Boolean query consisting of the word bear, and sends this query to the search engine 300. For a target collection 400 of any significant size, this query will yield a result set having a large number of hits. Because of the large size of the result set, in this example of a preferred embodiment of the present invention, no attempt will be made to download all corresponding documents. In this illustrative embodiment, a limit is chosen to yield a reasonably sized set of documents for. an initial set of extracted documents. The LSI Engine 630, using the LSI technique, processes the documents downloaded to the extracted document data store 620. Enough documents are downloaded to create an LSI space that covers the likely relevant vocabulary in some depth. This threshold may be determined empirically or the like. Typical numbers of documents for this initial download can be from about a few hundred to about ten thousand. There will likely be an initial delay in the operation of the system due to the time required to download these documents (as limited by the bandwidth of the communications path between the target collection 400 and the extracted documents data store 620) and/or the time required to process them using the singular value decomposition (SVD) algorithm in creating the LSI space.

Although there are some bootstrap methods whereby the query refinement process could begin immediately, it typically will be preferred to present some of these documents to the user 100 for evaluation at the start of the refinement process. Preferably, all that will be required of the user is to examine a few documents and provide some indication of their degree of interest, i.e., how relevant they are to the information need that the user is trying to satisfy. We will assume in this example that, while reviewing each of these documents, he or she clicks on one of three buttons, representing highly relevant, mildly relevant, and irrelevant. For concreteness in this example, we will assume that the system presents 10 documents to the user for review and relevance judgment.

Historically, there have been attempts to make use of user feedback in improving the effectiveness of text retrieval systems. However, these existing approaches generally have used this information in ways that tend to average out the feedback. Preferred embodiments of the present invention can explicitly use this information in a discrete fashion. One potential advantage of preferred embodiments of the present invention is that even small amounts of user feedback have great discriminatory power when used in this discrete fashion. In this example, the requirements placed on the user so far have been minimal. The initial query was trivial. The time required to review 10 documents in general would be only a few minutes. The only action required of the user during this review is to indicate which of three relevance categories each falls into (highly relevant, mildly relevant, or irrelevant). Nonetheless, when treated as discrete information items, the combinatorics of this feedback is substantial. For example, in indicating which of three categories 10 items fall into, the user has selected one of $3^{10}$ possible rankings of these documents. Three raised to the tenth power is 59049. The large size of this number illustrates the discriminatory power contained in even a small amount of user feedback.

Prior to obtaining the user feedback, the ability to rank the collection of extracted documents was limited. Basically, the only content-related criterion upon which they could be ranked was the frequency of occurrence of the word bear. This is a typical assumption in text retrieval—that the more frequently a query term appears in a document, the more likely that document is to be relevant to the information needs of the originator of the query. In practice, this number of occurrences typically would be normalized by dividing the number of occurrences in each document by the length of each document.

Once the initial user feedback has been obtained, however, preferred embodiments can provide many possibilities for creating more effective rankings of the documents. For example, an LSI space provides us with a very powerful approach to ranking. As noted above, the closer together two documents are in the LSI space, the closer they generally are in content. Thus, the documents that the user has identified as being of high relevancy define "regions of interest" in the space. The documents in the space that are near to these regions are likely to be of much greater interest than those that lie far from these regions. Thus, the closer a given document is to one of the documents rated as being of high relevancy, the more highly ranked that document should be. Similarly, documents that are nearest to those designated by the user as being irrelevant should be given a low ranking. Documents near to those designated by the user as being of mild relevance should be given an intermediate ranking. There are of course, many variants of this basic ranking that could be employed. The distances to pairs, clusters, or each entire set of designated high-relevancy, mild-relevancy, or irrelevant documents could be taken into consideration. In some embodiments, weighted combinations of distances to the nearest high-relevancy, mild-relevancy, and irrelevant documents could be combined.

In addition to the direct indication of relevance derived in the above fashion, the LSI space provides much additional information of value in the refinement process. The actual distribution of the documents provides many clues to how the documents in the space may relate to a user's information needs. The positions of specific words in the space also provide much important information. This information preferably is analyzed in two modules of preferred embodiments of the present invention. The universal ranking engine 650 takes this information into account in generating improved rankings. The hypothesis generator 680 uses this information in generating sets of potential improvements in the current Boolean query.

Preferred embodiments of the present invention include processes of query and ranking refinement. These processes can be generally compared to what often occurs when a requestor works through an intermediary in obtaining information. The requestor will explain his or her information needs in an initial meeting with the intermediary. The intermediary, often a librarian or research assistant, often subsequently will present intermediate results to the requestor. Upon reviewing these results, the requestor typically will provide some additional information that helps the intermediary to better understand the information requirement. It should be noted that during this iterative process, the understanding of the information need on the part of the requestor might be modified. Review of intermediate results may indicate that some elements of the requirement, as originally conceived, may no longer be of interest. Similarly, new items of interest that are relevant may be identified.

Preferred embodiments of the present invention include two features in order to implement a highly automated query and ranking refinement process:

A mechanism for generating hypotheses regarding possible modifications to the current query and ranking strategy, and;

A mechanism for determining if a proposed modification is beneficial or detrimental.

Preferred embodiments of the present invention can implement both these features through a novel application of the latent semantic indexing technique. The ability to carry out these functions with increased effectiveness is facilitated by two aspects of the LSI space used in preferred embodiments of the present invention:

Both documents and words are represented in the same space.

The distance between objects in the space is a good indication of the distance between the objects in a conceptual sense.

In some preferred embodiments of the present invention, the hypothesis generation function 680 is based on analysis of the locations of objects in the LSI space. For purposes of example, a two-dimensional LSI space is considered. In practice, the LSI spaces employed will have a substantially greater dimensionality. Those in the art would be able to, based on this disclosure, apply the principles herein to higher-dimensional spaces. In addition, distances in LSI spaces are measured in terms of cosines between vectors. Because humans are accustomed to dealing with distances in terms of spatial extent, for illustrative purposes only, the distances between vectors are discussed as if they were spatial distances. This will facilitate understanding. In a strict technical discussion, however, the distances would all be described in terms of cosine measurements or the like.

Figure 8:
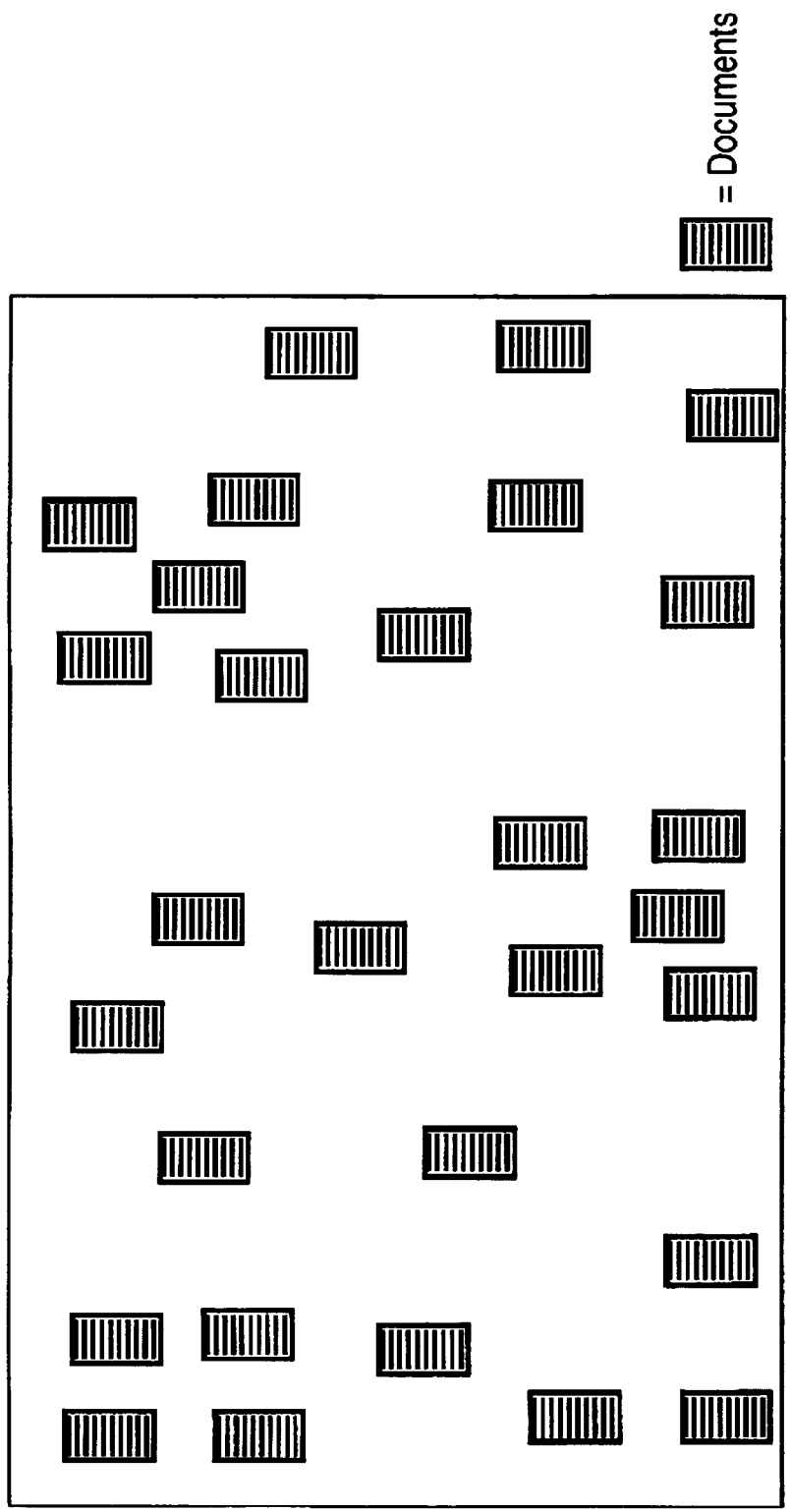
FIG. 8 is a simplified illustration of two dimensions of an LSI space.
Figure 9:
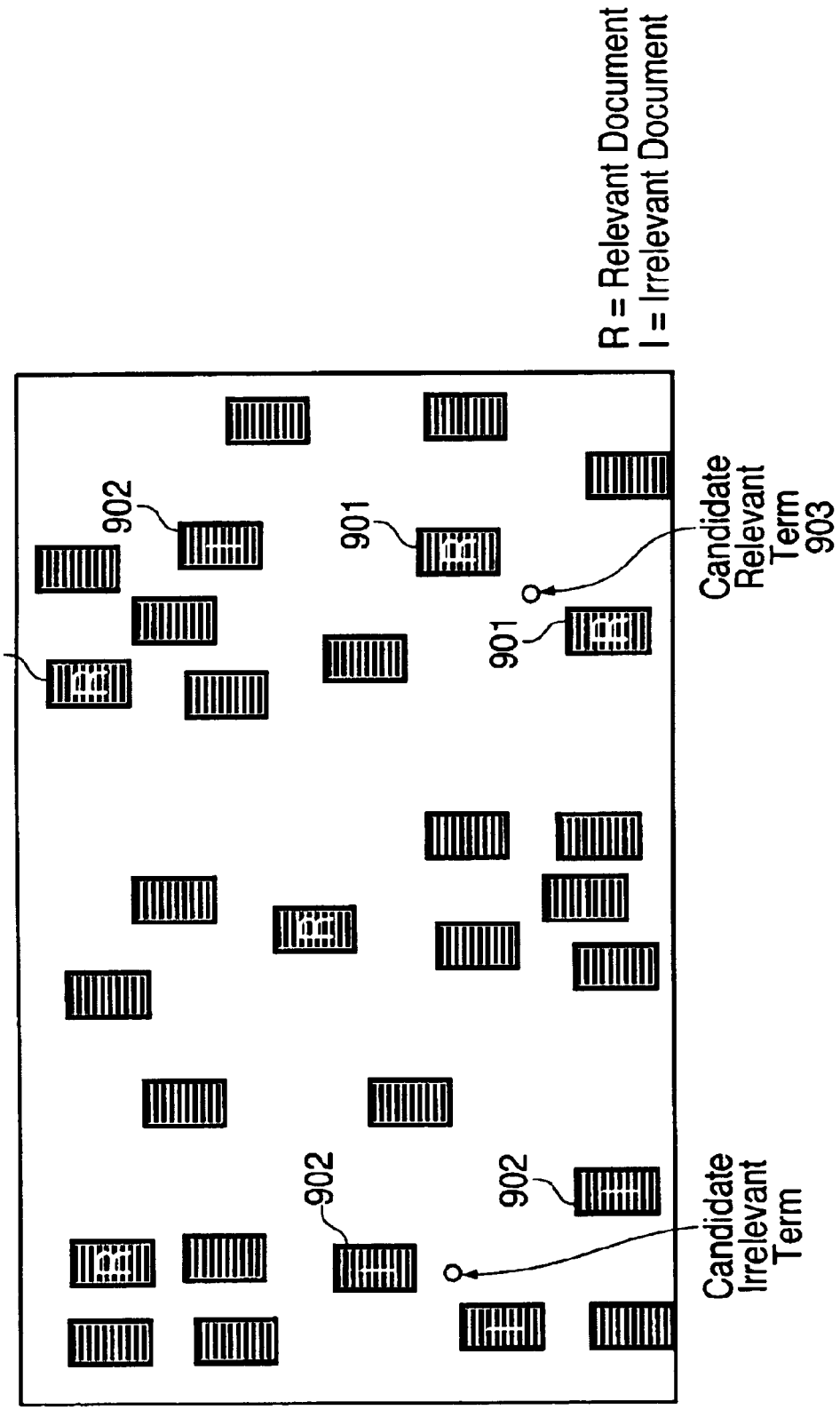
FIG. 9 is a simplified illustration of two dimensions of an LSI space, showing hypothetical locations of sample documents and terms, including the relevancy of those items.

FIG. 8 is an illustrative two-dimensional representation of an LSI space. Let us assume that this space has been generated by an initial query, as described above. Let us further assume that we have at least one round of feedback from the user, in which the user has designated some documents as being of either relevant or irrelevant to the user's information need. FIG. 9 labels some of the documents as relevant (R) 901 and some as irrelevant (I) 902. There are many ways in which clues can be derived from this space that suggest changes that might be made to the current query to improve its performance. For example, an analysis of the clustering of the documents indicates that there is a small cluster of relevant documents in the lower right hand corner of the space, and a cluster of irrelevant documents in the lower left hand corner of the space. In addition, there are some individual distributed relevant and irrelevant documents. Both isolated documents and clusters of documents can be used as the starting point for analysis.

As noted above, preferably all of the words in all of the extracted documents have a location in this space. The locations of some common words, such as the, and, of, etc., is not of topical significance and thus will not be considered here. (In fact, these words often are treated as stop words in creating LSI spaces, i.e., they are not processed.) Other words, such as help, are applicable in such a wide variety of contexts that they also will not be discussed here. There may, however, be certain collections of documents where the locations of such words provide useful information. The treatment of these words in such cases is not significantly different from that described in the following and thus will not be treated here. The vast majority of words have some degree of topical relationship, and it is those words that are addressed in this example.

For the small cluster of relevant documents in the lower right hand corner of FIG. 9, it is a simple task to determine what words in the LSI space are close to the cluster. Commercial LSI software packages accept as inputs objects that may be words, queries, or documents. Locations in the space also may be specified as a starting point. Commercial LSI software will typically return a list of the words, queries, or documents that are closest to the input object. This list is ranked in order of distance, with the closest object first. In the present example, focusing on the centroid of the cluster of relevant documents, a ranked list of the words nearest to the centroid can be retrieved. A word that is located close to the documents that have been identified as relevant has a high probability of itself expressing a concept that is relevant to the current information need. Thus, a word such as the one identified in the term 903 in the lower right of FIG. 9 is a candidate relevant word. There are a variety of ways in which this information could be used in structuring hypotheses regarding possible improved queries. One simple method will be described below in accordance with one preferred embodiment of the present invention.

Designating the current query as QUERYNOW and the candidate relevant word as CRW, we may combine CRW with QUERYNOW using a logical OR operator, as follows: QUERYNOW OR CRW=MODQUERY. In many cases, MODQUERY (the modified query) will be a better representation of the user's information needs than the former one. In other cases, the opposite will be true. Preferred embodiments of the present invention include a means that indicates which of these results is more likely. This can be done, for example, through a three-step process as follows.

MODQUERY is applied to the documents in the extracted document store 620 using a Boolean retrieval system 640 integral to the current invention. This need not be the same retrieval software as the search engine 300 that is applied to the target collection 400. It may be any text retrieval software capable of processing complex Boolean queries.

The universal ranking engine 650 ranks the result set returned by the Boolean Engine 640 based on MODQUERY. This module can take into account information currently available in the extracted document store 620 to produce as accurate a ranking as possible.

The ranking of documents produced in the above manner is compared to the ranking of documents produced by the user 100. The position of documents in the LSI space is used to produce a tentative interpolation of the "proper" rankings of documents that have not been explicitly ranked by the user 100.

Preferably, at all times, the full combinatorial richness of the input from the user 100 is used as a "gold standard" of what the ranking should be.

In this illustrative case, the logic of the hypothesis testing is preferably as follows. If the incorporation of the CRW into QUERYNOW is a beneficial thing to do, this should be reflected in a better ranking of the documents in the result set generated by the three steps outlined above. The universal ranking engine 650 takes into account the number of occurrences of terms of interest in the documents that are being ranked. The basic assumption is that, all else being equal, documents that contain more terms that are of interest should be more highly ranked than those that contain fewer. There are a number of ways such rules can be applied, as would be understood by those in the art. The newly ranked set of documents is compared to the ranking of documents explicitly produced by the user 100. A general principle that is preferably applied is that the new ranking of documents should not contradict the explicit relevancy identified by the user 100. That is, all documents that were indicated as being highly relevant by the user 100 preferably should be highly ranked in the new ranking. All documents that were identified by the user 100 as being of low relevance preferably should be ranked lower than the designated high-relevance documents in the new ranking. All documents identified by the user 100 as irrelevant preferably should either be absent from the new set of ranked documents or ranked very low.

At any given point in the process, the number of documents for which relevancy has been identified by the user 100 will be relatively small in comparison to the total number of documents automatically ranked. Closeness in the LSI space is used to interpolate "proper" positions for documents that have not been explicitly ranked. That is, a document that is very close in the LSI space to one that has been explicitly ranked should be close to that document in the new ranking.

In some cases, it will be clear that a new ranked result set is significantly better than the previous one. In those cases, MODQUERY will be re-designated as the new working query, i.e., QUERYNOW. In other cases, the new ranked result set will be noticeably inferior to the existing one, and the modification will not be made. In some cases, the differences will be slight. This will be true more often when there is a relatively small amount of feedback available from the user. Some potential modifications in this class may simply not be made. Others can be held for further analysis. Thresholds can be established to determine which potential modifications may receive further consideration. This may be based on a consideration of predicted impact. For example, consider a word whose inclusion in the query using an OR statement has little effect on the ranking. This word might be very close in the space to one whose inclusion using an OR statement led to a much improved ranking. This apparent contradiction could be cause for saving this word for further analysis. Preferred embodiments of the present invention can include a list of apparent anomalies. Some of these anomalies will be statistical flukes. Many others, however, will reflect an as-yet-not-understood subtlety of the users information need.

Apparent anomalies receive subsequent treatment in two ways in preferred embodiments of the present invention. First, they may be held for later consideration for inclusion in the query. The order in which the Boolean logical operations are carried out can be significant. It may be the case that a candidate modification at one point has little beneficial effect. However, that same modification may later may have a much more beneficial effect. Second, the word under consideration may be incorporated into a question that is directly asked of the user. A prioritized list of such questions preferably is kept available at all times. A selected subset of these questions is preferably presented to the user whenever the opportunity is available.

In the process described above, it is notable that not all of the automated choices need be correct. However, what is important is that on average the choices should be correct. To the extent that this is true, the iterative query refinement process will converge to a solution—a highly effective query and ranking strategy. The more feedback that is available from the user, the more accurately and rapidly this process will converge.

Figure 10:
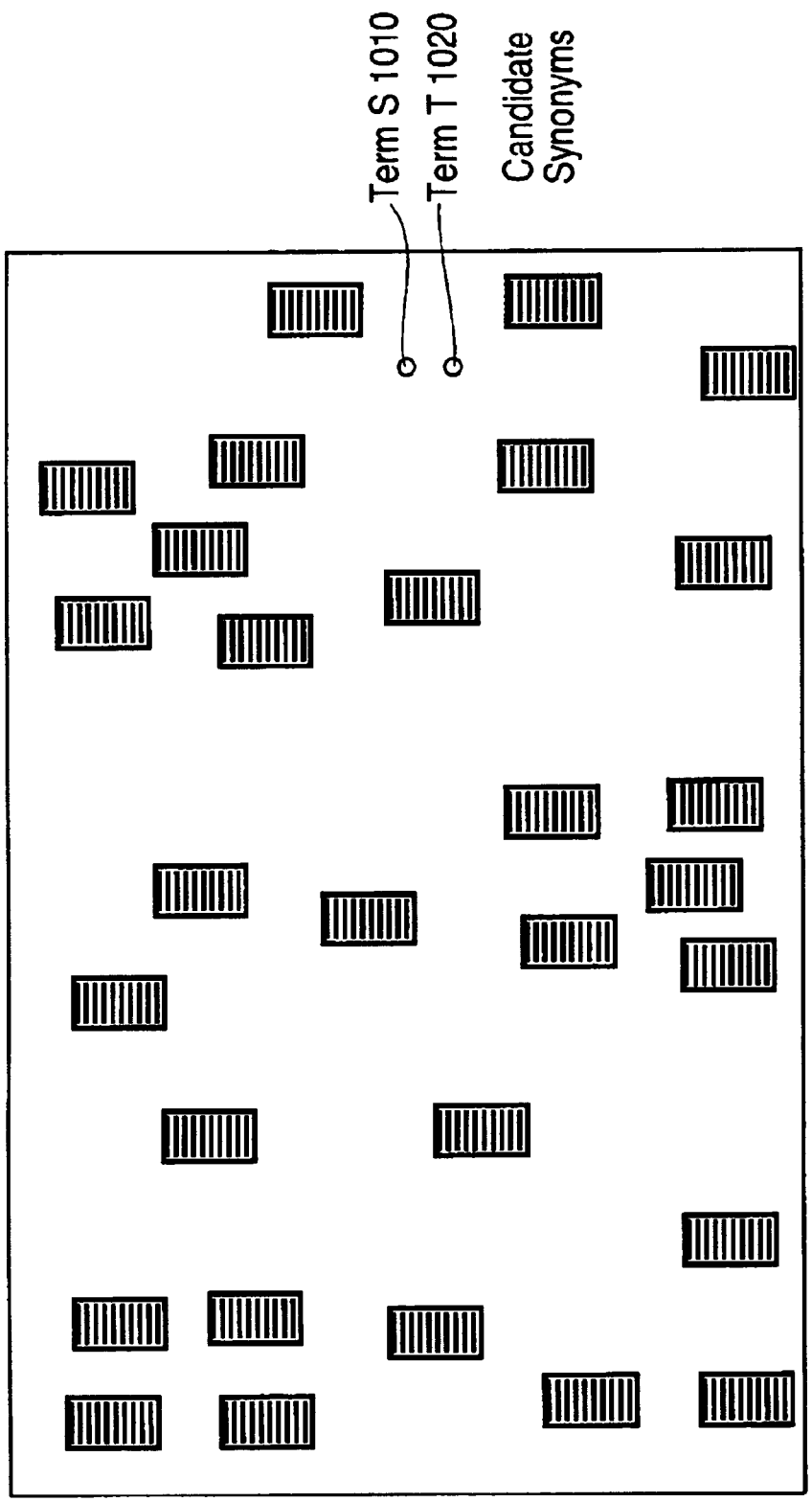
FIG. 10 is a simplified illustration of two dimensions of an LSI space, showing hypothetical locations of candidate synonyms.

Once it has been determined that a given word in the LSI space should be incorporated into a query in a given manner, other words that are near that one in the space may be considered for incorporation in the same manner. For example, consider the two terms shown in FIG. 10. Assume that the above procedure has indicated that term S 1010 should be incorporated into the current query using an OR operator. The fact that term T 1020 is close to term S 1010 in the space indicates that they have some conceptual similarity. The closer these two terms are in the space, the more they are likely to be synonyms. If the incorporation of OR TERM S 1010 into the query produced favorable results, then the incorporation of OR TERM T 1020 is a good hypothesis to be checked.

In addition to the specific example given above, many other candidate hypotheses can be derived from examining the LSI space such as the following, for example.

Words that are present in documents that are close to explicitly highly ranked documents are good candidates for incorporation into queries using an OR operator.

A word that is close, in LSI-space, to a document or cluster of documents that explicitly have been designated as irrelevant is good candidate for incorporation into the current query with an AND NOT operator Words that are present in documents that are close to those designated as being irrelevant are good candidates for incorporation into queries using an AND NOT operator Word pairs that co-occur in documents designated as being highly relevant and do not tend to co-occur in documents that have been designated as irrelevant are good candidates for incorporation into the current query with an AND operator.

Word pairs (WORD1 and WORD2) that co-occur in documents explicitly designated as irrelevant and do not co-occur in documents explicitly designated as relevant are good candidates for incorporation into the current query with a logical statement of the form: AND NOT (WORD1 AND WORD2).

In general, a word that is close to another word is a good candidate for treatment in any manner that has been found to be beneficial for the first word. In practice, suitable cosine value thresholds for closeness preferably are determined heuristically.

In all of the above cases, the operations focusing on individual words also can (and should) be carried out with a focus on phrases. This could be done using a list of common phrases. However, preferred embodiments of the present invention maintain maximum flexibility and require minimum maintenance. In this regard, some preferred embodiments of the present invention consider at least all consecutive pairs and triplets of words as potential phrases. This will encompass most phrases of interest. Longer phrases that actually occur in the documents can be determined by examining the statistics of the occurrence of consecutive runs of more than three words. Such runs that occur multiple times can then be treated as phrases in the above types of analyses.

The AND and AND NOT operations reduce the size of the result set and lead to high precision. As OR operations are included, the scope of the query is increased. As such operations are added, it will be desirable from time to time to exercise the external search loop and download any additional documents that the expanded query identifies. It is desirable to download only the newly identified documents and add them to the existing store of extracted documents, rather than downloading an entire new result set. Most practical implementations would preferably allow this.

At this point, the impressive combinatorics of the present hypothesis generation and testing technique are evident. In most practical applications, the downloaded set of extracted documents may collectively encompass thousands to tens of thousands of terms. Several thousand of these terms may be analyzed in each of the ways listed above. Thus, even in a single pass, several tens of thousands of candidate hypotheses can be generated. Moreover, every time there is feedback from the user 100, it is desirable to re-test all hypotheses in light of this new information. Feedback from the user 100 is highly advantageous and can be used to the maximum extent practical to further increase the efficiency of the system. In a similar fashion, whenever new documents are downloaded to the data store of extracted documents 620, it may be desirable to re-test the hypotheses. This will be true particularly in cases where a significant number of OR operations have been incorporated into the query. It also will be true in cases where a significant amount of new information is likely to have been added to the target collection 400. In general, it can be anticipated that at least several user feedback sessions will take place. In addition, several downloads of additional documents are likely to take place. Thus, from the view of hypothesis generation and testing, there are likely to be a hundred thousand or more candidate query modifications to be tested.

While the LSI space provides many potential clues for query refinement, it also yields many clues to be considered in modifying strategies for ranking result sets. For any given document, the universal ranking engine 650 may take into account all or some of the following information from the LSI space generated by the LSI engine 630:

Nearby terms;

Proximity of the document to explicitly designated relevant documents;

Proximity of the document to explicitly designated irrelevant documents;

Terms in or near nearby documents;

Terms in the document also in or near explicitly designated relevant documents;

Terms in the document not in or near explicitly designated relevant documents;

Terms in the document also in or near explicitly designated irrelevant documents;

Terms in the document not in or near explicitly designated irrelevant documents;

Term co-occurrence statistics in the space;

Term co-occurrence statistics in clusters;

Data and subsection formats within the document; and

Metadata associated with the document.

In addition, once again, all of the above types of analyses can be applied to phrases. In all cases, the treatment can range from consideration of averages of the class of objects to an exhaustive treatment of all relevant term, phrase, and document occurrences. The number of possible ranking strategies will correspondingly vary from, for example, scores to tens of thousands. In a preferred embodiment, the extent to which these many possibilities are explored would be controllable. This could be done by implementing universal ranking engine logic wherein the granularity of the processing could be controlled by an external parameter. Alternatively, the software could incorporate heuristically derived metrics that would terminate the ranking refinement process when it reached some point of diminishing returns.

In some preferred embodiments, both the query formulation and result set ranking processes can operate on metadata. For example, key elements of documents, such as date or source, may be of great importance in determining a users interest in those documents. Internet standards such as the resource description framework (RDF) and the extensible markup language (XML) are leading content providers to incorporate more metadata in document and web page headers. Many retrieval systems allow Boolean operations involving such fields to be combined with Boolean operations on the textual content of the documents. In preferred embodiments of the present invention, metadata may be treated on an equivalent basis to words and phrases that appear in text. Although such tags may not appear in the LSI space, they may readily be examined in the query refinement and ranking refinement operations. The fact that such processing may be going on can be completely transparent to the user. Preferred embodiments of the present invention thus allow the widest possible range of relevant data to be taken into account in selecting and ranking documents. Notably, this can be done without requiring the user to consciously address the relative importance of each item that is taken into consideration.

In comparison to the number of query modification hypotheses likely to be tested by a user 100, the larger number of query modification hypotheses that can be tested by preferred embodiments of the present invention constitutes an increase in search and retrieval capability. Similarly, the larger number of ranking strategies that can be tested presents major advantages. In many cases, some time will be necessary for the associated processing to take place.

In some preferred embodiments of the present invention, the user will refine a query in short interaction sessions (e.g., several minutes to a few tens of minutes), likely spread over a few days. In such embodiments, the processing time will not present a concern. In other embodiments, where the processing time needs to be minimized, the number of possibilities that are examined can be limited. For example, as noted above, characteristics of the distribution of objects in the LSI space can be used to produce an estimate of the likely impact of any given query modification. This estimate can be generated with much reduced effort in comparison to actually carrying out the calculations required to test that hypothesis. In an application where processing time is of importance, a threshold could be established so that only the changes with the highest probability of beneficial effect would be considered. Similarly, in applications where the processing time is a concern, the degree of granularity of the ranking hypotheses could be reduced.

One preferred aspect of preferred embodiments of the present invention that incorporate user feedback is that cumulative user feedback is preferably employed to create a "gold standard" document ranking. Typically, a user may be able to determine the relevance or irrelevance of a document in a few tens of seconds of examination. Thus, for example, in a ten-minute interaction session, the user might designate the relevance (or irrelevance) of 20 or so documents. In three such sessions, the user will have selected one of $2^{60}$ or $3^{60}$ possible rankings of this set. As this number increases, the discrimination capabilities of the query refinement loop increase greatly. Moreover, the likelihood that an incorrect query modification is made decreases.

In another preferred embodiment of the present invention, the user is presented with specific questions to refine the query. This is a means of obtaining more specific feedback than that obtained when whole documents are indicated as relevant or irrelevant. Many candidates for such questions will be developed as the query refinement loop 660 is exercised. These may be presented to the user via another very simple interface, such as the one shown in FIG. 11.

It should be recognized that various preferred embodiments and characteristics thereof, which have been described, are merely illustrative of the principles of this invention. Numerous modifications and adaptations thereof will be readily apparent to those skilled in the art without departing from the spirit and scope of the present invention.

What is claimed is:

1. In an information retrieval system having a current query, and a search engine that is responsive to a query to retrieve documents relevant to the query from a document collection, a method for refining the current query, the method comprising:

receiving information regarding the relevancy of documents retrieved at least in part in response to the current query;

ranking the retrieved documents at least in part in accordance with the relevancy information;

forming at least one candidate query based at least in part on one or more of:
   the rankings and,
   analysis of locations of the retrieved documents in a latent semantic index vector space formed from at least the retrieved documents;

applying at least one candidate query to the document collection;

ranking the documents retrieved in response to each applied candidate query in accordance with the received relevancy information;

comparing the ranking of documents retrieved in response to at least one applied candidate query and the ranking of documents retrieved in response to the current query with the received relevancy information; and choosing the query, from among the current query and each candidate query, which produces the best ranking.

2. A computer implemented method for refining a query, the method comprising:

receiving information regarding the relevancy to an information need of documents retrieved from a document collection at least in part in response to a current query;

ranking the retrieved documents at least in part in accordance with the relevancy information;

forming at least one candidate query based at least in part on at least one of:
   the rankings and,
   the locations of the retrieved documents in a latent semantic index vector space formed from at least the retrieved documents;

applying the at least one candidate query to the document collection;

ranking the documents retrieved in response to each applied candidate query at least in part in accordance with the received relevancy information;

comparing the ranking of documents retrieved in response to at least one applied candidate query and the ranking of documents retrieved in response to the current query with the received relevancy information; and choosing the query, from among the compared queries, which produces the best ranking.

* * * * *